United States Patent
Khambatkone et al.

(10) Patent No.: US 7,729,253 B1
(45) Date of Patent: Jun. 1, 2010

(54) REDUCED AVAILABLE BANDWIDTH UPDATES

(75) Inventors: Alok Khambatkone, Santa Clara, CA (US); Wushao Wen, Cupertino, CA (US); Neeraj Gulati, Cupertino, CA (US); Premal Dinesh Desai, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 1044 days.

(21) Appl. No.: 10/768,059

(22) Filed: Feb. 2, 2004

(51) Int. Cl.
*G01R 31/08* (2006.01)

(52) U.S. Cl. .................. 370/235; 370/255; 370/395.2; 370/468; 709/226; 709/242

(58) Field of Classification Search .............. 370/229, 370/230, 230.1, 235, 252, 395, 468; 709/225, 709/242
See application file for complete search history.

(56) References Cited

U.S. PATENT DOCUMENTS 6,097,735 A * 8/2000 Nemoto ................. 370/476
6,785,252 B1 * 8/2004 Zimmerman et al. ....... 370/337
7,222,191 B2 * 5/2007 Dolganow et al. ......... 709/242
2003/0206516 A1 * 11/2003 Chen et al. ................ 370/227

OTHER PUBLICATIONS

Chang et al. Dynamic Update of Aggregated Routing Information for Hierarchical QoS Routing in ATM Networks; Parallel and Distributed Systems, 2001. ICPADS 2001 p. 653+.*

* cited by examiner

*Primary Examiner*—Donald L Mills
*Assistant Examiner*—Henry Baron
(74) *Attorney, Agent, or Firm*—Clements Bernard PLLC; Christopher L. Bernard; Tyler S. Brown

(57) ABSTRACT

An embodiment of the invention provides a flexible bandwidth advertisement method that can reduce the number of routing updates that are sent in a network. In an embodiment of the invention, a method of reducing available bandwidth updates in a link in a communication system is provided. The method includes setting a range of threshold values. An actual available bandwidth in the link is then changed. If the actual available bandwidth changes from a first value within the range of threshold values to a second value within the range of threshold values, then a transmission of an available bandwidth update on the link is then prevented.

19 Claims, 6 Drawing Sheets

200

| Threshold values 150:<br>0-47 range → advertised available bw is equal to actual available bw<br>48-191 range → advertised available bw is equal to actual available bw<br>192 → advertised available bw is equal to actual available bw |
|---|
| At t = 0: Actual available bw (bandwidth) = 192; Advertised available bw = 192 |
| At t = 1: An STS-1 SNC is created. Actual available bw = 191; A routing update is sent out with Advertised available bw=191. |
| At t = 2: An STS-48c SNC is created. Actual available bw = 143; A routing update is sent out with Advertised available bw=143. |
| At t = 3: An STS-48c SNC is created. Actual available bw = 95; A routing update is sent out with Advertised available bw=95. |
| At t = 4: An STS-48c SNC is created. Actual available bw=47; A routing update is sent out with Advertised available bw=47. |
| At t = 5: 1 STS-1 SNC is created. Actual available bw=46; A routing update is sent out with Advertised available bw=46. |
| At t = 6: 45 more STS-1 SNCs are created. Actual available bw and Advertised available bw progressively reduce from 45 through 1 with routing updates being sent out. |
| At t = 7: 1 STS-1 SNC is created. Actual available bw=0; A routing update is sent out with Advertised available bw=0. |

Conventional Method

| |
|---|
| Threshold values 150:<br>0-47 range → advertised available bw is equal to actual available bw<br>48-191 range → advertised available bw of 48 is sent once<br>192 → advertised available bw is equal to actual available bw |
| At t= 0: Actual available bw = 192; Advertised available bw = 192 |
| At t= 1: An STS-1 SNC is created; Actual available bw = 191; A routing update is sent out with Advertised available bw=48. |
| At t= 2: An STS-48c SNC is created. Actual available bw = 143; Advertised available bw remains at 48. No routing update is sent, since previous actual available bw of 191 and new actual available bw of 143 are both in the 48-191 range. |
| At t= 3: An STS-48c SNC is created. Actual available bw = 95; Advertised available bw remains at 48. No routing update is sent, since previous actual available bw of 143 and new actual available bw of 95 are both in the 48-191 range. |
| At t= 4: 47 STS-1 SNCs are created. Actual available bw = 48; Advertised available bw remains at 48. No routing update is sent, , since previous actual available bw of 95 and new actual available bw of 48 are both in the 48-191 range. |
| At t= 5: 1 STS-1 SNC is created. Actual available bw =47; A routing update is sent out with Advertised available bw=47. |
| At t= 6: 1 STS-1 SNC is created. Actual available bw =46; A routing update is sent out with Advertised available bw=46. |
| At t= 7: 45 more STS-1 SNCs are created. Actual available bw and Advertised available bw progressively reduce from 45 through 1 with routing updates being sent out. |
| At t= 8: 1 STS-1 SNC is created. Actual available bw=0; A routing update is sent out with Advertised available bw=0. |

| Threshold values 150:<br>0-47 range → advertised available bw is equal to actual available bw<br>48-191 range → advertised available bw of 48 is sent once<br>192 → advertised available bw is equal to actual available bw |
|---|
| At t= 0: Actual available bw=0; Advertised available bw=0 |
| At t= 1: 1 STS-1 SNC is released. Actual available bw=1; A routing update is sent out with Advertised available bw=1. |
| At t= 2: 45 more STS-1 SNCs are released. Actual available bw and Advertised available bw progressively increased from 1 through 46 with routing updates being sent out. |
| At t= 3: 1 STS-1 SNC is released. Actual available bw =47; A routing update is sent out with Advertised available bw=47. |
| At t= 4: 1 STS-1 SNC is released. Actual available bw =48; A routing update is sent out with Advertised available bw=48. |
| At t= 5: 47 STS-1 SNCs are released. Actual bw = 95; Advertised bw remains at 48. No routing update is sent. |
| At t= 6: An STS-48c SNC is released. Actual available bw = 143; Advertised available bw remains at 48. No routing update is sent. |
| At t= 7: An STS-48c SNC is released. Actual available bw = 191; Advertised available bw remains at 48. No routing update is sent. |
| At t= 8: An STS-1 SNC is released. Actual available bw = 192; A routing update is sent out with Advertised available bw=192. |

| |
|---|
| Threshold values 151: <br> 0 → advertised available bw of 0 is sent once <br> 1-2 range → advertised available bw of 1 is sent once <br> 3-11 range → advertised available bw of 3 is sent once <br> 12-23 range → advertised available bw of 12 is sent once <br> 24-47 range → advertised available bw of 24 is sent once <br> 48-191 range → advertised available bw of 48 is sent once <br> 192 → advertised available bw of 192 is sent once |
| At t = 0: Actual available bw=0; Advertised available bw = 0 |
| At t =1: 1 STS-1 SNC is released. Actual available bw=1; A routing update is sent out with Advertised available bw=1 |
| At t = 2: 1 STS-1 SNC is released. Actual available bw=2; Advertised available bw remains at 1. No routing update is sent. |
| At t=3: 1 STS-1 SNC is released. Actual available bw=3; A routing update is sent out with Advertised available bw=3 |
| At t = 4: 1 STS-1 SNC is released. Actual available bw=4; Advertised available bw remains at 3. No routing update is sent. |
| At t = 5: 12 STS-1 SNCs are released. Actual available bw=16. A routing update is sent out with Advertised available bw=12 |
| At = 6: 1 STS-1 SNC is released. Actual available bw=17; Advertised available bw remains at 12. No routing update is sent. |
| At t = 7: 20 STS-1 SNCs are released. Actual available bw=37. A routing update is sent out with Advertised available bw=24 |
| At t = 8: 10 STS-1 SNCs are released. Actual available bw=47; Advertised available bw remains at 24. No routing update is sent. |
| At t = 9: An STS-48c SNC is released. Actual available bw=95. A routing update is sent out with Advertised available bw=48. |
| At t = 10: 1 STS-1 SNC is released. Actual available bw=96; Advertised available bw remains at 48. No routing update is sent. |
| At t =11: 96 STS-1 SNCs are released. Actual available bw=192. A routing update is sent out with Advertised available bw=192 |
| At t = 12: 1 STS-1 SNC is created. Actual available bw=191; A routing update is sent out with Advertised available bw=48 |

Figure 5

REDUCED AVAILABLE BANDWIDTH UPDATES

TECHNICAL FIELD

Embodiments of the invention relate generally to communication networks, and more particularly to an apparatus and method for providing reduced available bandwidth updates.

BACKGROUND

Large computer networks, such as Wide Area Networks (WAN) or Internet backbone systems often incorporate various types of network devices (nodes) and network protocols. The SONET (Synchronous Optical Network) system is a high bit-rate fiber-optic based transport system that has become a well established standard for linking low and high-speed devices such as switches and multiplexers in wide-scale networks. The SONET standard uses a 51.84 megabits per second (Mbps) signal as a building block to extend the digital transmission hierarchy into the multi-gigabit range.

The network devices or nodes in a SONET system may support a signaling protocol and a routing protocol such as, for example, the Optical Signaling & Routing Protocol (OSRP). Currently, for any link that is based upon OSRP, any and every change in the actual available bandwidth in the link will result in the transmission of a routing update across the link. This routing update will advertise the actual available bandwidth information in the link. However, the frequent transmission of routing updates prevents improvements in the scalability of the network.

Therefore, the current technology is limited in its capabilities and suffers from at least the above constraints and deficiencies.

SUMMARY OF EMBODIMENTS OF THE INVENTION

An embodiment of the invention provides a flexible bandwidth advertisement method that can reduce the number of routing updates that are sent in a network. An embodiment of the invention can be applicable for aggregated and unaggregated Optical Signaling & Routing Protocol (OSRP) links. By virtue of reducing the routing updates, the scalability of the network can be improved.

In an embodiment of the invention, a method of reducing available bandwidth updates in a link in a communication system is provided. A link is broadly defined as an optical fiber connected between two nodes. The method includes setting a range of threshold values. An actual available bandwidth in the link is then changed. If the actual available bandwidth changes from a first value within the range of threshold values to a second value within the range of threshold values, then a transmission of an available bandwidth update on the link is then prevented.

In another embodiment of the invention, an apparatus for reducing available bandwidth updates in a link in a communication system, includes: a node configured to change an actual available bandwidth in a link. The node is also configured to set a range of threshold values, and to prevent a transmission of an available bandwidth update on the link if the actual available bandwidth changes from a first value within the range of threshold values to a second value within the range of threshold values.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a table illustrating an example operation in accordance with a conventional method of providing available bandwidth updates across a link.

FIG. 3 is a table illustrating another example operation in accordance with an embodiment of the invention.

FIG. 4 is a table illustrating another example operation in accordance with an embodiment of the invention.

FIG. 5 is a table illustrating another example operation in accordance with an embodiment of the invention.

DETAILED DESCRIPTION

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention provides an advantage of reduction in routing traffic on links such as, for example, OSRP links. This advantage leads to improved scalability of a network of optical switches by reducing the number of routing messages in the network.

Figure 1:
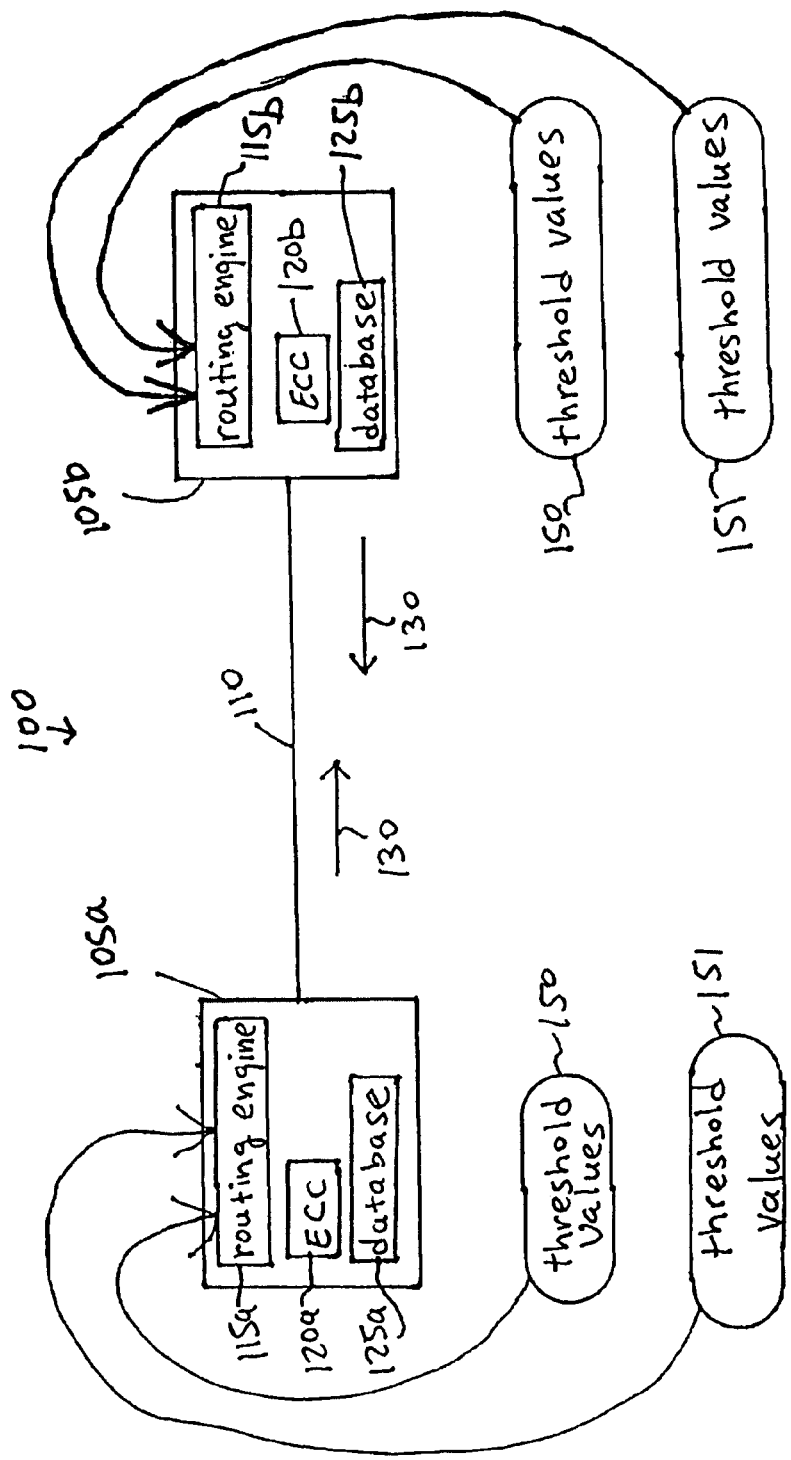
FIG. 1 is a block diagram of an apparatus or system, in accordance with an embodiment of the invention.

FIG. 1 is a block diagram of an apparatus (or system) 100, in accordance with an embodiment of the invention. The apparatus 100 is typically a portion of a communication network and includes node 105a and node 105b. Each node is a network element and may support various services such as sub-network connections (SNCs). A Sub Network Connection (SNC) is a collection of one or more SONET paths or SDH-(Synchronous Digital Hierarchy) paths. The SONET standard is used in the United States and Canada for transmitting information over optical fiber and is a variation of the SDH' standard. SDH is the ITU-TSS (International Telecommunications Union—Telecommunications Standards Sector) international standard transmitting information over optical fiber. More particularly, an SNC is a connection from a node in a separately identifiable part of a larger network to another node in the network, and typically spans multiple nodes and links. As part of an SNC creation, switching paths are created along the nodes that are traverse by SNC, thus enabling data to flow from the originating node to the destination node. In other words, an optical network can be partitioned into a set of optical sub-networks interconnected by optical links, and the SNC is a connection across an optical sub-network. For example, at least one of the nodes 105a and 105b may be a switch, such as, for example, a CIENA CoreDirector™ switch which is commercially available from CIENA COR- PORATION. Of course, each of the nodes 105a and 105b may be other suitable network elements.

The logical connection between the nodes 105a and 105b is commonly known as a link 110. The link may be aggregated or unaggregated. In the description herein, a link 110 is broadly defined as an optical fiber connected between two nodes, where each optical fiber could be of any capacity such as, for example, OC-3 (Optical Carrier 3), OC-12, OC-48 or OC-192. As known to those skilled in the art, OC-n is a SONET rate of n times 51.84 megabits per second (or n STS-1 frames), where n is typically equal to 1, 3, 12, 48, 192, or 768. STS-n (synchronous transport signal level-n) is the various sizes in the SONET hierarchy for an SNC, where n is typically equal to 1, 3, 12, 48, 192 or 768. STS-1 is the SONET standard for transmission over OC-1 optical fiber at a line rate of 51.84 Mbps. STS-n is the SONET standard for transmission over OC-1 optical fiber at a line rate of n×STS-1=n×(51.84 Mbps), where n is typically equal to 1, 3, 12, 48, 192, or 768. STS-nc (Synchronous Transport Signal "n" concatenated) is the SONET standards for transmission over OC-n optical fiber by multiplexing "n" STS-1 frames, (e.g., STS-3 at 155.52 Mbps; STS-12 at 622.08 Mbps; and STS-48 at 2.488 Gbps, but treating the information fields (frames) as a single concatenated payload, where a concatenated payload is a plurality of fields that are linked in series). The exact number of STS (synchronous transport signal) frames depends on the type and number of concatenated STS frames used (e.g., STS-3c or STS-12c). If none of the frames are concatenated, the number of STS frames is equal to n. If the frames are concatenated, then the number of frames is smaller than n.

The network node 105a includes a routing engine 115a, an edge call control (ECC) module 120a, and a Routing Database 125a. Similarly, the network node 105b includes a routing engine 115b, an edge call control (ECC) module 120b, and a Routing Database 125b. It is understood that each of the network nodes 105a and 105b includes known elements or modules that may typically be used to perform switching and/or routing functions in the system 100.

Typically, a routing engine (generally 115) in each node can compute a working route for a sub-network connection (SNC), and the ECC module (generally 120) in each node 105 interacts with the routing engine 115 to permit the working route to set up the SNC using a signaling protocol. The ECC module 305 in a node 105 manages all SNCs in a node. The ECC module 120 may also configure a proper protect route, which will be used as a working route if the originally selected working route is subject to a failure. The working route is typically selected or set up when the SNC is first set up in a node 105 in the communication network.

The routing engine 115 also sends advertisements (i.e., routing updates) 130 on the link 110, where an advertisement 130 includes available bandwidth information on the link 110. Typically, an advertisement 130 is sent by each node so that bandwidth information is advertised in a bidirectional manner across the link 110 when the connections in the link 110 are provisioned (created). For example, routing engine 115a in node 105a will send advertisement 130 across the link 110, and routing engine 115b in node 105b will receive the advertisement 130. The routing engine 115b also sends an advertisement 130 to routing engine 115a in node 105a to indicate available bandwidth information in the reverse direction. Therefore, bandwidth information is advertised bidirectionally across link 110.

Each link 110 between nodes 105 has a maximum bandwidth and an actual available bandwidth. As connections (SNCs) are provisioned across the link 110, the actual available bandwidth in the link is reduced. As connections (SNCs) are released across the link 110, the actual available bandwidth in the link is increased. Releasing an SNC results in all switching paths to be torn down along all the nodes and links that are traversed by the SNC.

In an embodiment of the invention, threshold values 150 are configured in the routing engines 115a and 115b to control and reduce the advertisements 130 across the link 110. Example threshold values 150 are described below with reference to FIGS. 2-4. The threshold values may be varied. For example, threshold values 151, as described below with reference to FIG. 5, will suppress advertisements 130 for changes in other actual bandwidth ranges in the link 110. Typically, the threshold values are stored in the database 125 and are accessed by the routing engines 115.

Link information in a network is stored in the routing database 125 in a node 105. Each link 110 will have an associated maximum bandwidth information and available bandwidth information that are stored in the routing database 125. When a routing engine 115 in a node 105 receives an advertisement (routing update) 130 for a particular link 110, the routing engine 115 will update the routing database 125 for the bandwidth change for the particular link 110. The ECC module 120 also accesses the routing database 125 in order to properly provision SNCs across the network.

Reference is now made to the table 200 in FIG. 2, as a preamble for better understanding the need for the present invention. The table 200 illustrates an example operation in accordance with a conventional method of providing available bandwidth updates across a link 110. The table 200 illustrates an un-optimized behavior, where any and each change in the bandwidth in a link 110 is propagated by an advertisement 130. Typically, the nodes 105a and 105b support a signaling protocol and a routing protocol. For example, the nodes 105a and 105b support an Optical Signaling and Routing Protocol ("OSRP"), which is described in more detail in commonly owned and co-pending U.S. patent application Ser. No. 09/259,263, filed Mar. 1, 1999, entitled "ROUTING AND SIGNALING IN A SONET NETWORK", which is hereby fully incorporated herein by reference, and Ser. No. 09/493,344, filed Jan. 28, 2000, entitled "SYSTEM AND METHOD FOR CALCULATING PROTECTION ROUTES IN A NETWORK PRIOR TO FAILURE", which is hereby fully incorporated herein by reference. The routing protocol in OSRP is responsible for various functions such as discovery of neighbors and link status, reliable distribution of routing topology information, and optimal route determination. The signaling protocol provides various capabilities such as the capability of establishing, tearing down, and modifying connections across a network of nodes. For an OSRP link (i.e., a link that is established by use of OSRP), typically the available bandwidth can change in the range of 0 to 192 (inclusive of 0 and 192).

As shown in FIG. 2, assume that at time t=0, the actual available bw (bandwidth) is 192 for the link 110. Therefore, an advertisement (routing update) 130 is sent (or previously sent) across the link 110 by the routing engine 115 and will indicate an advertised available bandwidth of 192 (i.e., actual available bandwidth of 192×51.84 Mbps=9,953.28 Mbps).

Now assume that at t=1, an STS-1 SNC is provisioned (created) in the link 110 by an ECC module 120 (e.g., ECC module 120a or 120b). As mentioned above, STS-n is the various SNC sizes in the SONET hierarchy, where n is typically equal to 1, 3, 12, 48, 192 or 768. Therefore, an STS-1 SNC is an SNC with a size of STS-1. When an STS-1 SNC is created in the link 110, a corresponding bandwidth of 1 (i.e., bandwidth of 1×51.84 Mbps=51.84 Mbps) is reduced from the bandwidth value of the link 110. As a result, the actual available bw will decrease from 192 to 191 (i.e., actual available bw=191=previous actual available bw value−actual available bw value change=192-1). Therefore, an advertisement (routing update) 130 is sent across the link 110 by the routing engine 115 and will indicate the new advertised available bandwidth of 191 (i.e., available bandwidth of 191× 51.84 Mbps=9,901.44 Mbps), since an advertisement 130 is sent for any changes in bandwidth of the link 110 in the previous conventional methods.

At t=2, an STS-48c SNC is created in the link 110. As a result, the actual available bw will decrease from 191 to 143 (i.e., actual available bw=143=191−48). Therefore, an advertisement (routing update) 130 is sent across the link 110 and will indicate an advertised available bandwidth of 143, since an advertisement 130 is sent for any changes in bandwidth of the link 110 in the previous methods.

At t=3, another STS-48c SNC is created in the link 110. As a result, the actual available bw will decrease from 143 to 95 (i.e., actual available bw=95=143-48). Therefore, an advertisement (routing update) 130 is sent across the link 110 and will indicate an advertised available bandwidth of 95, since an advertisement 130 is sent for any changes in bandwidth of the link 110 in the previous methods.

At t=4, another STS-48c SNC is created in the link 110. As a result, the actual available bw will decrease from 95 to 47 (i.e. actual available bw=47=95−48). Therefore, an advertisement (routing update) 130 is sent across the link 110 and will indicate an advertised available bandwidth of 47, since an advertisement 130 is sent for any changes in bandwidth of the link 110 in the previous methods.

At t=5, an STS-1 SNC is created in the link 110. As a result, the actual available bw will decrease from 47 to 46 (i.e., actual available bw=46=47−1). Therefore, an advertisement (routing update) 130 is sent across the link 110 and will indicate an advertised available bandwidth of 46, since an advertisement 130 is sent for any changes in bandwidth of the link 110 in the previous methods.

At t=6, 45 additional STS-1 SNCs are created in the link 110. As a result, the actual available bw will decrease from 46 to 1, after all of the 45 STS-1 SNCs are created (i.e., actual available bw=1=46−45). An advertisement (routing update) 130 is sent across the link 110 in sequence, for each decrease of unit 1 of actual available bandwidth. For example, when the actual available bw decreases from 46 to 45 after an STS-1 SNC is created, an advertisement (routing update) 130 is sent across the link 110 and will indicate an advertised available bandwidth of 45. When the actual available bw decreases from 45 to 44 after another STS-1 SNC is created, an advertisement (routing update) 130 is sent across the link 110 and will indicate an advertised available bandwidth of 44. As the actual available bw decreases by unit 1 for each STS-1 SNC that is created, an advertisement 130 is sent across the link 110 to indicate the new decreased advertised available bandwidth. When the actual available bw decreases to 1 after all of the 45 additional STS-1 SNCs are created, an advertisement (routing update) 130 is sent across the link 110 and will indicate an advertised available bandwidth of 1.

At t=7, an STS-1 SNC is created in the link 110. As a result, the actual available bw will decrease from 1 to 0 (i.e., actual available bw=0=1−1). Therefore, an advertisement (routing update) 130 is sent across the link 110 and will indicate an advertised available bandwidth of 0, since an advertisement 130 is sent for any changes in bandwidth of the link 110 in the previous methods.

Reference is now made to the table 300 in FIG. 3, in order to describe a method for reduced available bandwidth updates, in accordance with an embodiment of the invention. The table 300 illustrates an optimized behavior, where an advertisement 130 transmitted across the link 110 is reduced in number and is propagated only for particular bandwidth changes in the link 110, as described below. The following examples explain the optimization in the 48-192 bandwidth range. Note that the link 110 itself may or may not be aggregated. An embodiment of the invention is applicable for both unaggregated and aggregated links. The link aggregation feature is disclosed in, for example, commonly-assigned U.S. patent application Ser. No. 10/061,995, now U.S. Pat. No. 7,391,720 entitled "LINK AGGREGATION", which is hereby fully incorporated herein by reference.

As shown in FIG. 3, assume that at time t=0, the actual available bw (bandwidth) is 192 for the link 110. The routing engine 115*a* (in node 105*a*) will send (or previously sent) an advertisement 130 across the link 110. The routing engine 115*b* (in node 105*b*) will receive the advertisement 130 and update the routing database 125*b*. The advertisement 130 will indicate an advertised available bandwidth of 192. The routing engine 115*b* will send an advertisement 130 to routing engine 115*a* in node 105*a* to indicate the available bandwidth information in the reverse direction. The routing engine 115*a* will then update the routing database 125*a* with the advertisement 130 information.

Now assume that at t=1, an STS-1 SNC is provisioned (created) in the link 110 by the ECC module 120. When an STS-1 SNC is created in the link 110, a corresponding bandwidth of 1 is reduced from the actual available bandwidth value of the link 110. As a result, the actual available bw will decrease from 192 to 191 (i.e., actual available bw=191=192-1). Standard SNC/connection sizes in the bandwidth range of 48 through 192 (inclusive of 48 and 192) are 48 and 192 only, for both concatenated and non-concatenated signals. The range of 48 through 192 (inclusive of 48 and 192) will also be referred herein as the 48-192 range. In an embodiment of the invention, if the actual available bandwidth on the link 110 changes from 192 to any value in the 48-191 range (inclusive of 48 and 191), then an advertisement (routing update) 130 on the bandwidth change/update is sent (by the routing engine 115) only once, with the advertised available bandwidth as 48. The routing engine 115 can determine the actual available bandwidth on the link 110 by accessing the bandwidth information of link 110 in the database 125. At time t=1, the advertised available bandwidth will be 48, even though the actual available bandwidth on the link 110 is 191. As discussed below, if the actual available bandwidth is reduced from 191 through 48 (i.e., the 48-191 range), then no additional advertisements 130 is sent by the routing engine 115 for these changes in the 48-191 range. As also described below, if the actual available bandwidth changes from 48 to any value below 48, then an advertisement (routing update) 130 will be transmitted on the link 110 by the routing engine 115, with the advertised available bandwidth having a value that corresponds to the actual available bandwidth. For example, if the actual available bandwidth changes from 48 to 47, then an advertisement 130 is transmitted on the link 110, with the advertised available bandwidth at 47 for the link 110. If the actual available bandwidth changes from 47 to 46, then an advertisement 130 is transmitted on the link 110, with the advertised available bandwidth at 46 for the link 110. The advertisements 130 are transmitted on the link 110 for any and each bandwidth changes within the 0-47 range, in an embodiment of the invention.

At t=2, an STS-48c SNC is created in the link 110. As a result, the actual available bw will decrease from 191 to 143 (i.e., actual available bw=143=191-48). In accordance with an embodiment of the invention, the advertised available bandwidth remains at 48, because the new actual available bandwidth of 143 is within the 48-191 range. Therefore, no advertisement (routing update) 130 is sent on the link 110 by either of the routing engines 115a and 115b. As a result, there is a reduction in the number of advertisements 130 across the link 110.

At t=3, another STS-48c SNC is created in the link 110. As a result, the actual available bw will decrease from 143 to 95 (i.e., actual available bw=95=143-48). The advertised available bandwidth remains at 48, because the new actual available bandwidth of 95 is within the 48-191 range. Therefore, no advertisement (routing update) 130 is sent on the link 110 by the routing engine 115.

At t=4, 47 STS-1 SNCs are created in the link 110. As a result, the actual available bw will decrease from 95 to 48 (i.e., actual available bw=48=95-47). The advertised available bandwidth remains at 48, because the new actual available bandwidth of 48 is within the 48-191 range. Therefore, no advertisement (routing update) 130 is sent on the link 110 by the routing engine 115 as each of the 47 STS-1 SNCs are created.

At t=5, an STS-1 SNC is created in the link 110. As a result, the actual available bw will decrease from 48 to 47 (i.e., actual available bw=47=48-1). In accordance with an embodiment of the invention, the advertised available bandwidth is decreased to 47, and an advertisement (routing update) 130 is transmitted by the routing engine 115 on the link 110, with the advertised available bandwidth of 47 for the link 110. The advertisement 130 is transmitted because the new actual available bandwidth of 47 is not within the 48-191 range. As mentioned above, the advertisement 130 is transmitted by a routing engine 115 in a node 105 and the bandwidth information in the advertisement 130 is updated into the routing database 125 by the routing engine 115.

At t=6, an STS-1 SNC is created in the link 110. As a result, the actual available bw will decrease from 47 to 46 (i.e., actual available bw=46=47-1). In accordance with an embodiment of the invention, since the advertised available bandwidth has decreased to 46, an advertisement (routing update) 13'0% is transmitted on the link 110, with the advertised available bandwidth of 46 for the link 110. The advertisement 130 is transmitted because the new actual available bandwidth of 46 is not within the 48-191 range.

At t=7, 45 additional STS-1 SNCs are created in the link 110. As a result, the actual available bw will decrease from 46 to 1, after all of the 45 STS-1 are created (i.e., actual available bw=1=46-45). An advertisement (routing update) 130 is sent across the link 110 in sequence, for each decrease of unit 1 of actual available bandwidth. For example, when the actual available bw decreases from 46 to 45 after an STS-1 SNC is created, an advertisement (routing update) 130 is sent across the link 110 and will indicate an advertised available bandwidth of 45 for the link 110. When the actual available bw decreases from 45 to 44 after another STS-1 SNC is created, an advertisement (routing update) 130 is sent across the link 110 and will indicate an advertised available bandwidth of 44 for the link 110. As the actual available bw decreases by unit 1 for each STS-1 SNC that is created, an advertisement 130 is sent across the link 110 to indicate the new decreased advertised available bandwidth since the actual available bandwidth changes are not within the 48-191 range. When the actual available bw decreases to 1 after all of the 45 additional STS-1 SNC are created, an advertisement (routing update) 130 is sent across the link 110 and will indicate an advertised available bandwidth of 1 for the link 110.

At t=8, an STS-1 SNC is created in the link 110. As a result, the actual available bw will decrease from 1 to 0 (i.e., actual available bw=0=1-1). Therefore, an advertisement (routing update) 130 is sent across the link 110 and will indicate an advertised available bandwidth of 0 for the link 110. The advertisement 130 is transmitted because the new actual available bandwidth of 0 is not within the 48-191 range.

Therefore, in the method shown in the example of FIG. 3, a change in the actual available bandwidth (of the link 110) within the 0-47 range will cause a routing update 130 to be transmitted on the link 110, where each routing update 130 will have an advertised available bandwidth that is equal to the actual available bandwidth of the link 110. When the actual available bandwidth changes from 192 to a value within the 48-191 range, a routing update 130 (with the new advertised available bandwidth value of 48) is also transmitted on the link 110. When the actual available bandwidth changes from a value within the 48-191 range to any value within the 0-47 range, a routing update 130 (with the new advertised available bandwidth value equal to the new actual available bandwidth value) is also transmitted on the link 110. When the actual available bandwidth changes from a value within the 48-191 range to another value within the 48-191 range, then the advertised available bandwidth remains at 48 and a routing update 130 is not transmitted on the link 110.

It is noted that in the example shown in FIG. 3, other bandwidth change values for the link 110 can occur. Therefore, the specific bandwidth changes for the link 110 in FIG. 3 from time t=1 to time t=8 are presented for example purposes only and are not intended to limit the scope of the embodiments of the invention.

Reference is now made to the table 400 in FIG. 4, in order to describe another example of reducing available bandwidth updates, in accordance with an embodiment of the invention. If the actual available bandwidth on the link 110 increases within the range 0-47, then an advertisement 130 is transmitted on the link 110 to indicate the new advertised available bandwidth which will be equal to the new actual available bandwidth of the link 110. Assume that at time t=0, the actual available bw (bandwidth) is 0 for the link 110. The routing engine 115a (in node 105a) will send (or previously sent) an advertisement 130 across the link 110. The routing engine 115b (in node 105b) will receive the advertisement 130 and update the routing database 125b. The advertisement 130 will indicate an advertised available bandwidth of 0 for the link 110. The routing engine 115b will send the advertisement 130 back to routing engine 115a in node 105a. The routing engine 115a will then update the routing database 125a with the advertisement 130 information.

Now assume that at t=1, an STS-1 SNC is released in the link 110 by an ECC module 120 (FIG. 1). When an STS-1 SNC is released in the link 110, a corresponding bandwidth of 1 is gained in the actual available bandwidth value of the link 110. As a result, the actual available bw will increase from 0 to 1 (i.e., actual available bw=1=0+1). The change in the actual available bw from 0 to 1 will generate an advertisement (routing update) 130, with an advertised available bw of 1 for the link 110. Note that a change in actual available bandwidth from 1 to 47 will generate an advertisement 130, with an advertised available bw of 47. In an embodiment of the invention, if the actual available bandwidth on the link 110 changes to any value within the 0-47 range (inclusive of 0 and 47), then an advertisement (routing update) 130 on the available bandwidth change/update is sent with the advertised available bandwidth being equal to the actual available bandwidth.

At t=2, 45 additional STS-1 SNCs are released in the link 110. As a result, the actual available bw will increase from 1 to 46, after all of the 45 STS-1 are created (i.e., actual available bw=46=1+45). An advertisement (routing update) 130 is sent across the link 110 in sequence, for each increased of unit 1 of actual available bandwidth of the link 110. For example, when the actual available bw increases from 1 to 2 after an STS-1 SNC is released, an advertisement (routing update) 130 is sent across the link 110 and will indicate an advertised available bandwidth of 2 for the link 110. When the actual available bw increases from 2 to 3 after another STS-1 SNC is released, an advertisement (routing update) 130 is sent across the link 110 and will indicate an advertised available bandwidth of 3 for the link 110. As the actual available bw increases by unit 1 for each STS-1 SNC that is released, an advertisement 130 is sent across the link 110 to indicate the new increased advertised available bandwidth since the actual bandwidth changes are not within the 48-191 range. When the actual available bw has increased to 46 after all of the 45 additional STS-1 SNC are released, an advertisement (routing update) 130 is sent across the link 110 and will indicate an advertised available bandwidth of 46 for the link 110.

At t=3, an STS-1 SNC is released in the link 110. As a result, the actual available bw will increase from 46 to 47 (i.e., actual available bw=47=46+1). In accordance with an embodiment of the invention, since the advertised available bandwidth has increased to 47, an advertisement (routing update) 130 is transmitted on the link 110 with the advertised available bandwidth of 47 for the link 110. The advertisement 130 is transmitted because the new actual available bandwidth of 47 is not within the 48-191 range.

At t=4, an STS-1 SNC is released in the link 110. As a result, the actual available bw will increase from 47 to 48 (i.e., actual available bw=48=47+1). In accordance with an embodiment of the invention, since the advertised bandwidth increased to 48, an advertisement (routing update) 130 is transmitted on the link with the advertised available bandwidth of 48 for the link 110. The advertisement 130 is transmitted because the previous actual available bandwidth of 47 was outside the 48-191 range and the new actual available bandwidth of 48 is within the 48-181 range.

At t=5, 47 STS-1 SNC are released in the link 110. As a result, the actual available bw will increase from 48 to 95 (i.e., actual available bw=95=48+47). The advertised available bandwidth remains at 48 for the link 110, because the new actual available bandwidth of 95 for the link 110 remains within the 48-191 range. Therefore, no advertisement (routing update) 130 is sent on the link 110 by the routing engine 115.

If any actual available bandwidth on the link 110 increases in any value in the range of 48-191, then no advertisement 130 is transmitted on the link 110. For example, if the actual available bandwidth changes from 48 to 49 for the link 110, then no advertisement 130 is transmitted on the link 110. As another example, if the actual available bandwidth changes from 48 to 191 for the link 110, then no advertisement 130 is transmitted on the link 110.

At t=6, an STS-48c SNC is released in the link 110. As a result, the actual available bw will increase from 95 to 143 (i.e., actual available bw=143=95+48). In accordance with an embodiment of the invention, the advertised available bandwidth remains at 48, because the new actual available bandwidth of 143 remains within the 48-191 range. Therefore, no advertisement (routing update) 130 is sent on the link 110.

At t=7, another STS-48c SNC is released in the link 110. As a result, the actual available bw will increase from 143 to 191 (i.e., actual available bw=191=143+48). The advertised available bandwidth remains at 48, because the new actual available bandwidth of 191 is within the 48-191 range. Therefore, no advertisement (routing update) 130 is sent on the link 110.

At t=8, an STS-1 SNC is released in the link 110. As a result, the actual available bw will increase from 191 to 192 (i.e., actual available bw=192=191+1). Therefore, an advertisement (routing update) 130 is sent across the link 110 and will indicate an advertised available bandwidth of 192 for the link 110. The advertisement 130 is transmitted because the new actual available bandwidth of 192 is not within the 48-191 range.

It is noted that in the example shown in FIG. 4, other bandwidth change values can occur for the link 110. Therefore, the specific bandwidth changes from time t=1 to time t=8 are presented for example purposes only and are not intended to limit the scope of embodiments of the invention.

Reference is now made to the table 500 in FIG. 5, in order to describe another example of reducing available bandwidth updates 130, in accordance with an embodiment of the invention. Note that standard SNC/connection sizes include bandwidth values of 1, 3, 12, 24, and 48. In an embodiment of the invention, these values can be set as threshold values that will be advertised when the available bandwidth changes in the link 110. For example, the ranges can be set to 0, 1-2, 3-11, 12-23, 24-47, 48-191, and 192. The available bandwidth values that are advertised for these ranges 0, 1-2, 3-11, 12-23, 24-47, 48-191, and 192 will be the predefined bandwidth values of 0, 1, 3, 12, 24, 48, and 192, respectively, as described in the example of FIG. 5. Any change in the actual available bandwidth of the link 110 within any of these ranges themselves will cause no routing updates 130 to be sent across the link 110.

Referring to table 500 FIG. 5, assume that at time t=0, the actual available bandwidth is 0 for the link 110. The routing engine 115a (in node 105a) will send (or previously sent) an advertisement 130 across the link 110 to routing engine 115b (in node 105b). The routing engine 115b (in node 105b) will receive the advertisement 130 and update the routing database 125b. The advertisement 130 will indicate an advertised available bandwidth of 0 for the link 110. The routing engine 115b will send an advertisement 130 back to routing engine 115a in node 105a, with an advertised available bandwidth of 0. The routing engine 115a will then update the routing database 125a with the advertisement 130 information.

Now assume that at t=1, an STS-1 SNC is released in the link 110 by an ECC module 120 (FIG. 1). When an STS-1 SNC is released in the link 110, a corresponding bandwidth of 1 is gained in the actual available bandwidth value of the link 110. As a result, the actual available bw will increase from 0 to 1 (i.e., actual available bw=1=0+1), which is in the 1-2 range in the threshold values 151. The change in actual available bw from 0 to 1 will generate an advertisement (routing update) 130 with an advertised available bw of 1 for the link 110.

At t=2, 1 STS-1 SNC is released in the link 110. As a result, the actual available bw will increase from 1 to 2 (i.e., actual bw=2=1+1), which is still in the 1-2 range in the threshold values 151. The advertised available bandwidth remains at 1 for the link 110, because the new actual available bandwidth of 2 remains within the 1-2 range. Therefore, no advertisement (routing update) 130 is sent on the link 110 because the previous advertised available bandwidth of 1 did not change.

At t=3, 1 STS-1 SNC is released in the link 110. As a result, the actual available bw will increase from 2 to 3 (i.e., actual available bw=3=2+1), which is in the 3-11 range in the threshold values 151. Therefore, an advertisement (routing update) 130 is sent on the link 110 with the new advertised available bandwidth of 3 for the link 110.

At t=4, 1 STS-1 SNC is released in the link 110. As a result, the actual available bw will increase from 3 to 4 (i.e., actual bw=4=3+1), which is still in the 3-11 range in the threshold values 151. The advertised available bandwidth remains at 3, because the new actual available bandwidth of 4 remains within the 3-11 range. Therefore, no advertisement (routing update) 130 is sent on the link 110 because the previous advertised available bandwidth of 3 did not change.

At t=5, 12 STS-1 SNCs are released in the link 110. As a result, the actual available bw will increase from 4 to 16 (i.e., actual available bw=16=4+12) after all 12 STS-1 SNCs have been released. Note that after 8 of the 12 STS-1 SNCs are released, the actual available bw will be 12 (i.e., actual available bw=12=4+8). As a result, the actual available bandwidth increases to 12 which is in the 12-23 range in the threshold values 151 (FIG. 1). Therefore, an advertisement (routing update) 130 is sent on the link 110 with the new advertised available bandwidth of 12 for the link 110.

Note that after 9 of the 12 STS-1 SNCs are released, the actual available bw will be 13 (i.e., actual available bw=13=12+1), which is still in the 12-23 range in the threshold values 151. The advertised available bandwidth remains at 12 for the link 110, because the new actual available bandwidth of 13 remains within the 12-23 range. Therefore, no advertisement (routing update) 130 is sent on the link 110 because the previous advertised available bandwidth of 12 did not change.

Note further that after all of the 12 STS-1 SNCs are released, the actual available bw will be 16, which is still in the 12-23 range in the threshold values 151. The advertised available bandwidth remains at 12 for the link 110, because the new actual available bandwidth of 16 remains within the 12-23 range. Therefore, no advertisement (routing update) 130 is sent on the link 110 because the previous advertised available bandwidth of 12 did not change.

At t=6, 1 STS1 SNC is released in the link 110. As a result, the actual available bw will increase from 16 to 17 (i.e., actual bw=17=16+1), which is still in the 12-23 range. Therefore, no advertisement (routing update) 130 is sent on the link 110 because the previous advertised available bandwidth of 12 did not change.

At t=7, 20 STS-1 SNCs are released in the link 110. As a result, the actual available bw will increase from 17 to 37 (i.e., actual available bw=37=17+20) after all 20 STS-1 SNCs have been released. As a result, the actual available bandwidth increases to 37 which is in the 24-47 range in the threshold values 151. Note that an advertisement (routing update) 130 is sent on the link 110 with the new advertised available bandwidth of 24 when the actual available bandwidth has increased to 24. When the actual bandwidth has increased to 37, the advertised bandwidth remains at 24 and an advertisement 130 is not sent on the link 110.

At t=8, 10 STS-1 SNCs are released in the link 110. As a result, the actual available bw will increase from 37 to 47 (i.e., actual bw=47=37+10), which is still in the 24-47 range. Therefore, no advertisement (routing update) 130 is sent on the link 110 because the previous advertised available bandwidth of 24 did not change.

At t=9, 1 STS-48c SNC is released in the link 110. As a result, the actual available bw will increase from 47 to 95 (i.e., actual available bw=95=47+48), which is in the 48-191 range in the threshold values 151. An advertisement (routing update) 130 is sent on the link 110 with the new advertised available bandwidth of 48 for the link 110.

At t=10, 1 STS-1 SNC is released in the link 110. As a result, the actual available bw will increase from 95 to 96 (i.e., actual bw=96=95+1), which is still in the 48-191 range. Therefore, no advertisement (routing update) 130 is sent on the link 110 because the previous advertised available bandwidth of 48 did not change.

At t=11, 96 STS-1 SNC is released in the link 110. As a result, the actual available bw will increase from 96 to 192 (i.e., actual available bw=192=96+96), which is in the 192 range in the threshold values 151 (FIG. 1). Therefore, an advertisement (routing update) 130 is sent on the link 110 with the new advertised available bandwidth of 192 for the link 110.

As an additional example, assume that at t=12, 1 STS-1 SNC is released in the link 110. As a result, the actual available bw will decrease from 192 to 191 (i.e., actual available bw=191=192−1), which is in the 48-191 range. Therefore, an advertisement (routing update) 130 is sent on the link 110 with the new advertised available bandwidth of 48 for the link 110.

It is noted that in the example shown in FIG. 5, other bandwidth change values for the link 110 can occur. Therefore, the specific bandwidth changes from time t=1 to time t=12 are presented for example purposes only and are not intended to limit the scope of embodiments of the invention.

Figure 6:
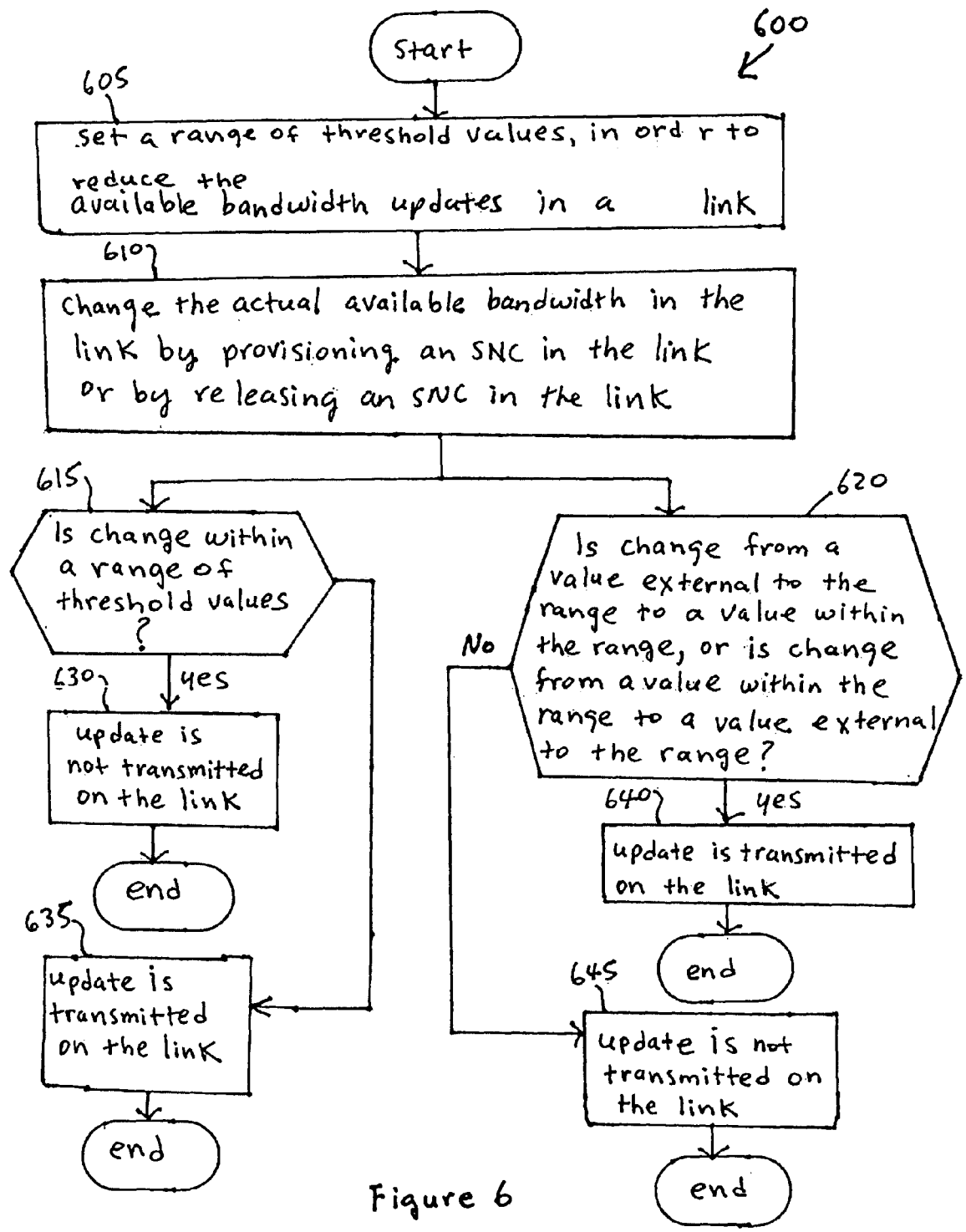
FIG. 6 is a flowchart illustrating a method in accordance with an embodiment of the invention

FIG. 6 is a flowchart illustrating a method 600 in accordance with an embodiment of the invention. A range of threshold values are set (605) in order to reduce the available bandwidth updates 130 in a link 110. As previously discussed above, one or more range of threshold values can be set, in order to reduce the available bandwidth updates 130. For example, the range can be set to the 48-191 range, as described above with reference to FIG. 3. As another example, a plurality of ranges can be set at 1-2, 3-11, 12-23, 24-47, 48-191, as described above with reference to FIG. 5. The number of ranges that are set in step (605) may vary.

The actual available bandwidth in the link 110 is then changed (610). The actual available bandwidth can be changed (610) by provisioning an SNC in the link 110 or by releasing an SNC in the link 110.

The steps (615) and (620) determine if an available bandwidth update 130 will be transmitted across the link 110, in response to the change in actual available bandwidth in the link 110. Typically, the steps (615) and (620) are performed concurrently by a routing engine 115 in a node 105. In steps (615) and (620), the routing engine 115 checks if the new actual available bandwidth value falls within the range (or ranges) of threshold values.

In step (615), a check is performed to determine if the change in the actual available bandwidth of the link 110 is within a range of threshold values of bandwidth values. If the change in the actual available bandwidth of the link 110 is within the range of threshold values, then an update 130 is not transmitted (630) on the link 110. If the change in the actual available bandwidth of the link 110 is not within the range of threshold values, then an update 130 is transmitted (635) on the link 110. The update 130 will include an advertised available bandwidth value of the link 110, where the advertised available bandwidth value is equal to the actual available bandwidth value of the link 110.

As an example, assume that the range of threshold values is 48-191, as similarly described above with reference to FIG. 3. Assume that the actual available bandwidth changes from a first value of 48 to a second value of 50 for the link 110. Since the values of 48 and 50 are within the 48-191 range, the change in the actual available bandwidth is within the 48-191 range. Therefore, an update 130 is not transmitted (630) on the link 110.

As another example, assume that the actual available bandwidth changes from a first value of 48 to a second value of 192 for the link 110. Since the value of 48 is within the 48-191 range and the second value of 192 is not within the 48-191 range, the change in the actual available bandwidth is not within the 48-191 range. Therefore, an update 130 is transmitted (635) on the link 110, with the update 130 including an advertised available bandwidth value of 192 for the link 110.

In step (620), a check is performed to determine if the change in actual available bandwidth is from a first value external to the range of threshold values to a second value within the range. Step (620) also includes checking if the change in actual available bandwidth is from a first value within the range to a second value external to the range. If the change in actual available bandwidth is from a first value external to the range to a second value within the range, or if the change in actual available bandwidth is from a first value within the range to a second value external to the range, then an update 130 is transmitted (640) on the link 110, with the update 130 including an advertised available bandwidth value of the link 110. Otherwise, the update is not transmitted (645) on the link 110.

As an example, if the actual available bandwidth changes from a first value of 47 to a second value of 50 for the link 110, then the change in actual available bandwidth is from a first value external to the range of 48-191 to a second value within the range 48-191, in step (620). As a result, an update 130 is transmitted on the link 110, with an advertised available bandwidth of 48 for the link 110.

As another example, if the actual available bandwidth changes from a first value of 48 to a second value of 45 for the link 110, then the change in actual available bandwidth is from a first value within the range 48-191 to a second value external to the range 48-191. As a result, an update 130 is transmitted on the link 110, with an advertised available bandwidth that is equal to the actual available bandwidth if the value of 45 is not within a second define range of threshold values.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of this invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

The various engines or modules discussed herein may be, for example, software, commands, data files, programs, code, modules, instructions, hardware, circuits, combinations thereof, or any of the like, and may also include suitable mechanisms.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

The description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of reducing available bandwidth updates in a link in a communication system, the method comprising the steps of:

providing an optical network utilizing an optical signaling and a routing protocol for establishing subnetwork connections (SNCs) over the link, the link formed between a first optical node and a second optical node each in the optical network;

setting a plurality of ranges of threshold values on the link, wherein the plurality of ranges of threshold values each comprise one of a predetermined range of SONET bandwidth values and a predetermined range of SDH bandwidth values, wherein the predetermined range of SONET bandwidth values and the predetermined range of SDH bandwidth values each correspond to standard subnetwork connection (SNC) sizes, wherein the plurality of ranges comprise at least a first range and a second range, and wherein the link comprises one of an aggregated and an unaggregated link;

changing an actual available bandwidth comprising of one of SONET and SDH bandwidth in the link by adding or removing SNCs traversing the link between the first and second optical nodes;

if the actual available bandwidth changes from a first value within one of the plurality of ranges of threshold values to a second value within the one of the plurality of ranges of threshold values, then preventing a transmission of an available bandwidth update on the link;

if the actual available bandwidth changes from a first value within one of the plurality of ranges of threshold values to a second value external to the one of the plurality of ranges of threshold values, then transmitting the available bandwidth update on the link with one of the incremental standard SNC connection size that can be added to the link based on the actual available bandwidth on the link; and if the actual available bandwidth changes from a third value within one of the plurality of ranges of threshold values to a fourth value below the lowest threshold boundary value, then transmitting the available bandwidth update on the link as an actual value available.

2. The method of claim 1, wherein the available bandwidth update includes an advertised available bandwidth value of the link.

3. The method of claim 1, wherein changing the actual available bandwidth comprises:
provisioning a subnetwork connection (SNC) in the link utilizing Optical Signaling and Routing Protocol.

4. The method of claim 1, wherein changing the actual available bandwidth comprises the step of:
releasing a subnetwork connection (SNC) in the link.

5. The method of claim 1, wherein the available bandwidth update includes an advertised available bandwidth that is equal to a predefined available bandwidth value that is associated with each of the plurality of ranges of threshold values.

6. The method of claim 1, wherein the standard SNC size comprises one of SONET bandwidth values of 1, 3, 12, 24, and 48.

7. The method of claim 1, wherein one of the plurality of ranges of threshold values comprises a bandwidth values range of 48-191.

8. The method of claim 7, wherein the range of 48-191 will have an associated predefined standard SNC connection size advertised available bandwidth value of 48 that is included in the available bandwidth update.

9. The method of claim 1, wherein the available bandwidth update is transmitted bi-directionally across the link.

10. An apparatus for reducing available bandwidth updates in a link in a communication system, the apparatus comprising:
a node configured to change an actual available bandwidth on the link comprising one of SONET and SDH bandwidth in the link; the node further configured to set a plurality of ranges of threshold values, wherein the plurality of ranges of threshold values comprises one of a range of predetermined SONET bandwidth values and a range of predetermined SDH bandwidth values, wherein the predetermined range of SONET bandwidth values and the predetermined range of SDH bandwidth values each correspond to standard subnetwork connection (SNC) sizes, wherein the plurality of ranges comprise at least a first range and a second range, and prevent a transmission of an available bandwidth update on the link if the actual available bandwidth changes from a first value within one of the plurality of ranges of threshold values to a second value within the one of the plurality of ranges of threshold values;
wherein the communication system comprises an optical network utilizing an optical signaling and a routing protocol for establishing subnetwork connections (SNCs) over the link, wherein the link comprises one of an aggregated and an unaggregated link, and wherein the preventing step enables scalability of a network of optical switches providing reduced routing messages;
wherein the node is further configured to transmit the available bandwidth update on the link if the actual available bandwidth changes from a first value external to one of the plurality of ranges of threshold values to a second value within the one of the plurality of ranges of threshold values, wherein the available bandwidth update that is transmitted comprises an incremental standard SNC connection size that can be added to the link based on the actual available bandwidth on the link;
and wherein the node is further configured to transmit the available bandwidth update on the link if the actual available bandwidth changes from a third value below the lowest threshold boundary value to a fourth value within the one of the plurality of ranges of threshold values, wherein the available bandwidth update that is transmitted comprises the actual bandwidth available on the link.

11. The apparatus of claim 10, wherein the node comprises:
an edge call control module configured to change the actual available bandwidth in the link; and
a routing engine configured to set the plurality of ranges of threshold values, and prevent the transmission of available bandwidth update on the link if the actual available bandwidth changes from a first value within one of the plurality of ranges of threshold values to a second value within the one of the plurality of ranges of threshold values.

12. The apparatus of claim 10, wherein the available bandwidth update includes an advertised available bandwidth value of the link.

13. The apparatus of claim 10, wherein the actual available bandwidth is change by provisioning a subnetwork connection (SNC) in the link.

14. The apparatus of claim 10, wherein the actual available bandwidth is changed by releasing a subnetwork connection (SNC) in the link.

15. The apparatus of claim 10, wherein the standard SNC size comprises one of SONET bandwidth values of 1, 3, 12, 24, and 48.

16. The apparatus of claim 10, wherein the one of the plurality of ranges comprises a bandwidth values range of 48-191.

17. The apparatus of claim 16, wherein the range of 48-191 will have an associated predefined standard SNC connection size advertised available bandwidth value of 48 that is included in the available bandwidth update.

18. The apparatus of claim 10, wherein the available bandwidth update is transmitted bi-directionally across the link.

19. An article of manufacture, comprising:
a machine-readable medium having stored thereon instructions to:
set a plurality of ranges of threshold values, wherein the plurality of ranges of threshold values comprise one of a predetermined range of SONET bandwidth values and a predetermined range of SDH bandwidth values, wherein the plurality of ranges comprise at least a first range and a second range, and wherein the predetermined range of SONET bandwidth values and the predetermined range of SDH bandwidth values each correspond to standard subnetwork connection (SNC) sizes;
change an actual available bandwidth comprising one of SONET and SDH bandwidth in the link; and
if the actual available bandwidth changes from a first value within one of the plurality of ranges of threshold values to a second value within the one of the plurality of ranges of threshold values, then prevent a transmission of an available bandwidth update on the link;
if the actual available bandwidth changes from a first value within one of the plurality of ranges of threshold values to a second value external to the one of the plurality of ranges of threshold values, then transmitting the available bandwidth update on the link with one of the incremental standard SNC connection size that can be added to the link based on the actual available bandwidth on the link; and
if the actual available bandwidth changes from a third value within one of the plurality of ranges of threshold values to a fourth value below the lowest threshold boundary value, then transmitting the available bandwidth update on the link as an actual value available.

* * * * *